US006669407B2

(12) United States Patent
Markusch et al.

(10) Patent No.: US 6,669,407 B2
(45) Date of Patent: Dec. 30, 2003

(54) POLYURETHANE GEOTEXTILE COMPOSITE LINER WITH IMPROVED WATER RESISTANCE AND A PROCESS FOR THE PRODUCTION THEREOF

(75) Inventors: Peter H. Markusch, McMurray, PA (US); Ashok Sarpeshkar, Upper St. Clair, PA (US); Marylyn Donaldson, Coraopolis, PA (US); W. Tracy Estabrook, Pittsburgh, PA (US); Ralf Guether, Pittsburgh, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/809,023

(22) Filed: Mar. 15, 2001

(65) Prior Publication Data

US 2002/0172565 A1 Nov. 21, 2002

(51) Int. Cl.[7] .............................. E02B 3/12; E01C 23/03
(52) U.S. Cl. ...................... 405/184.2; 405/36; 524/590; 528/60; 528/61
(58) Field of Search ............................ 524/590; 528/60, 528/61; 405/36, 184.2

(56) References Cited

U.S. PATENT DOCUMENTS

| | | | | | |
|---|---|---|---|---|---|
| 4,251,401 | A | * | 2/1981 | Reischl | 524/27 |
| 4,310,373 | A | * | 1/1982 | Schuhmacher et al. | 156/306.6 |
| 4,368,278 | A | * | 1/1983 | Rasshofer et al. | 521/115 |
| 4,521,465 | A | * | 6/1985 | Schroer et al. | 427/333 |
| 4,582,891 | A | | 4/1986 | Maki et al. | 528/74.5 |
| 4,728,710 | A | * | 3/1988 | Goel | 528/58 |
| 4,743,672 | A | * | 5/1988 | Goel | 528/44 |
| 4,872,784 | A | * | 10/1989 | Payne | 156/550 |
| 4,889,915 | A | * | 12/1989 | Brauer et al. | 524/590 |
| 4,955,759 | A | | 9/1990 | Payne | 405/270 |
| 4,955,760 | A | | 9/1990 | Payne | 405/270 |
| 5,049,006 | A | | 9/1991 | Payne | 405/270 |
| 5,061,776 | A | * | 10/1991 | Weaver et al. | 156/330 |
| 5,062,740 | A | | 11/1991 | Payne | 405/270 |
| 5,166,303 | A | * | 11/1992 | Markusch et al. | 528/26 |
| 5,306,798 | A | * | 4/1994 | Horn et al. | 528/58 |
| 5,378,733 | A | * | 1/1995 | Bates et al. | 521/54 |
| 5,421,677 | A | * | 6/1995 | Adam et al. | 405/118 |
| 5,603,798 | A | * | 2/1997 | Bhat | 156/327 |
| 5,607,998 | A | * | 3/1997 | Markusch et al. | 156/327 |
| 5,631,319 | A | * | 5/1997 | Reese et al. | 521/137 |
| 5,688,860 | A | * | 11/1997 | Croft | 521/122 |
| 5,770,673 | A | * | 6/1998 | Markusch et al. | 525/410 |
| 5,962,620 | A | * | 10/1999 | Reich et al. | 528/76 |

FOREIGN PATENT DOCUMENTS

| | | | |
|---|---|---|---|
| EP | 0 130 458 | | 1/1985 |
| EP | 1108735 A1 * | 6/2001 | ............ C08G/18/10 |
| EP | 1110985 A2 * | 6/2001 | ............ C08G/18/66 |
| EP | 1106638 A3 * | 9/2001 | ............ C08G/18/66 |
| EP | 1217021 A1 * | 6/2002 | ............ C08G/18/78 |

OTHER PUBLICATIONS

Payne Material and Supply, downloaded from http://www.payneholding.com/pms.htm, Payne Material and Supply, LLC link/"Materials and Supplies", "Irrigation ditch canal linings, liner, seepage control section" posted Jan. 19, 2000, 4 pages plus 1 page date doc.*

Guether et al, "Polyurethane/geotextile composites", GFR, May 2001, vol 19, No. 4, 6 pages.*

* cited by examiner

*Primary Examiner*—J. J. Swann
*Assistant Examiner*—Katherine Mitchell
(74) *Attorney, Agent, or Firm*—Joseph C. Gil; John E. Mrozinski, Jr.

(57) ABSTRACT

A water-resistant polyurethane geotextile composite suitable for use as a liner is made by impregnating a geotextile with a water-resistant polyurethane and allowing the polyurethane impregnated in the geotextile to cure. The water-resistant polyurethane composition is a reaction product of (a) a liquid polyisocyanate having an isocyanate content of at least 10% by weight, (b) an isocyanate-reactive component which includes (1) 20–90% by weight castor oil having a water content of less than 0.5% by weight, and (2) a polyether polyol in which at least 70% by weight of the alkylene oxide is propylene oxide, and (c) a urethane catalyst. Low molecular weight diols and triols and fillers may optionally be included.

21 Claims, No Drawings

POLYURETHANE GEOTEXTILE COMPOSITE LINER WITH IMPROVED WATER RESISTANCE AND A PROCESS FOR THE PRODUCTION THEREOF

TECHNICAL FIELD OF THE INVENTION

The present invention relates to a polyurethane geotextile composite having improved water resistance. Additionally, the present invention relates to a process for forming a polyurethane geotextile composite having improved water resistance.

BACKGROUND OF THE INVENTION

In recent years, the management of natural resources has become important in many countries throughout the world. Efforts have been directed both toward the conservation of our resources and toward the elimination of pollution from our environment. Particular emphasis has been placed on waste leakage and water loss.

Losses in the distribution of water using unlined irrigation ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks, etc. and, more commonly, mixtures thereof. The porosity will depend upon the proportions of the different components in the soil.

The loss of water in unlined irrigation ditches at one time was considered acceptable only because the supply of water exceeded demand. However, as civilization has developed and world population has increased, more water is required for both greater food production and for the marked by increasing in non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water is still in relatively short supply, particularly in recent years with the severe droughts in the United States and other countries. Since the most cost effective conservation opportunities and readily accessible water supplies already have been developed, greater attention must be directed to improving the efficiency of water distribution systems.

Improvements in water distribution have been made. A limited number of ditches and canals have been lined with concrete and/or preformed concrete pipes. Concrete is durable and has a long life when properly used. However, concrete is expensive to place and finish and is damaged by unfavorable temperatures during curing. Also, concrete is subject to frost damage, cracking and heaving which results in leaks.

Processes for forming composite liners for canals and ditches and apparatus to perform such a processes are disclosed, for example, in U.S. Pat. Nos. 4,872,784; 4,955,759; 4,955,760; 5,049,006; 5,062,740; and 5,421,677.

However, the above-noted patents give almost no guidelines as to the solidifiable compositions which should be used. For example, U.S. Pat. No. 4,872,784 (at column 5, lines 55–60), U.S. Pat. No. 4,955,759 (at column 5, lines 58–63), U.S. Pat. No. 4,955,760 (at column 4, lines 55–60) and U.S. Pat. No. 5,062,740 (at column 4, lines 56–61) broadly suggest the use of a foamed polyurethane resin but no specific formulations are taught or suggested. U.S. Pat. No. 5,049,006 (at column 4, lines 26–32) and U.S. Pat. No. 5,145,282 (at column 5, line 64—column 6, line 2) broadly suggest the use of a thermosetting resin forming mixture such as a polyester or a polyurethane forming mixture, without describing any specific formulations.

U.S. Pat. No. 5,421,677 ("the '677 patent") is directed to an improved process for forming a ditch liner. The '677 patent discloses the use of a mixture of one or more polyisocyanates, a polyol mixture, one or more fillers, and a catalyst. The mixture of the '677 patent is dispensed on a geotextile, thereby forming a liquid polyurethane soaked geotextile composite. The liquid polyurethane soaked geotextile composite is then placed over the surface of an area to be lined and allowed to cure, to form a polyurethane/geotextile composite. One drawback of the mixture taught by the '677 patent is that the filler in the mixture is often not completely dry and can absorb additional moisture from the atmosphere. Moisture is always present when the mixture is applied under relatively humid conditions. This water will react with the polyisocyanate and cause the mixture to foam. Foaming weakens the strength and impermeability of the composite.

Even when completely dry fillers are used in the mixture under non-humid conditions, the polyurethane geotextile composite, when stored under water (such as in a ditch or canal liner application), can absorb considerable amounts of water (i.e., 1–2%) which swells and weakens the liner.

For the foregoing reasons, it would be desirable to develop an improved polyurethane composition that does not foam, even when applied under humid conditions and is less sensitive when wet filler is used in the polyurethane composition. Additionally, it would be desirable to develop a polyurethane geotextile composite liner that has substantially lower water absorption.

SUMMARY OF THE INVENTION

The present invention relates to a polyurethane geotextile composite with improved water resistance useful as a liner for a ditch or canal in which the polyurethane used is a reaction product of a mixture comprising:

a) a liquid polyisocyanate having an isocyanate content of at least 10% by weight, b) an isocyanate-reactive component comprising:
  (i) 20 to 90% by weight, based on total weight of b), of castor oil having an OH number of from about 160 to about 170, a viscosity of from about 500 to about 900 mPa·s at 25° C., and a water content of less than 0.5% by weight, based on the total weight of castor oil;
  (ii) 10 to 80% by weight, based on total weight of b), of a polyether polyol having an OH number of from 28 to 700, a functionality of from 2 to 8, a number average molecular weight of from about 240 to about 6,000, and a viscosity of from 50 to 35,000 mPa·s at 25° C., in which at least 70% by weight of the alkylene oxide content is propylene oxide; and
  (iii) from 0 to 10% by weight, based on total weight of component b), of a low molecular weight diol or triol having an equivalent weight of 31 to 99; and c) a catalyst for the reaction of hydroxyl groups with isocyanate groups; and optionally, d) a filler.

The invention further relates to a process for producing a polyurethane geotextile composite liner with improved water resistance in which a geotextile is impregnated with such polyurethane.

The invention is also directed to a ditch or canal lined with such polyurethane geotextile composite and to a process for lining a ditch or canal with such composite.

The advantage of the polyurethane composition used to produce the composite of the present invention is that it has less tendency to foam. The geotextile polyurethane composite of the present invention will, therefore, be characterized by low water absorption. When such composite is used to line a ditch and/or a canal, water loss is kept at a minimum.

DETAILED DESCRIPTION OF THE INVENTION

The present invention relates to a polyurethane geotextile composite which is suitable for use as a liner with improved water resistance which is produced by impregnating a geotextile with a polyurethane composition that is a reaction product of a mixture which includes:

a) a liquid polyisocyanate having an isocyanate content of at least 10% by weight, b) an isocyanate-reactive component which includes:
   (i) from 20 to 90% by weight, based on total weight of b), of castor oil having an OH number of from about 160 to about 170, a viscosity of from about 500 to about 900 mPa·s at 25° C., and a water content of less than 0.5% by weight, based on the total weight of castor oil;
   (ii) from 10 to 80% by weight, based on total weight of b), of a polyether polyol having an OH number of from 28 to 700, a functionality of from 2 to 8, a number average molecular weight of from about 240 to about 6,000, and a viscosity of from 50 to 35,000 mPa·s at 25° C., the polyether polyol being prepared by reacting initiator with one or more alkylene oxides in which at least 70% by weight of the total alkylene oxide is propylene oxide; and
   (iii) from 0 to 10% by weight, based on total weight of component b) of a low molecular weight (i.e., molecular weight less than 240 (number average)) diol or triol having an equivalent weight of from 31 to 99, c) a catalyst which catalyzes the reaction between hydroxyl groups and isocyanate groups; and optionally, d) a filler.

The invention is also directed to a method for making such composites, ditches and canals lined with such composites and to a method for lining ditches and canals with such composites. A ditch or canal is lined with the polyurethane geotextile composite of the present invention by dispensing a polyurethane composition having improved water resistance onto a geotextile or otherwise impregnating the geotextile with the polyurethane composition, laying the polyurethane-impregnated geotextile onto a surface of a ditch or canal before the polyurethane has fully cured, conforming the polyurethane impregnated geotextile to the shape of the surface of the ditch or canal, and allowing the polyurethane to fully cure to form a polyurethane geotextile composite liner. The polyurethane composition having improved water resistance is a reaction product of the above described components a), b) and c).

The polyurethane composition having improved water resistance may be applied onto one or more geotextiles. A second polyurethane impregnated geotextile may be laid on the surface of a canal or ditch which has previously been lined with the liquid polyurethane composition is fully cured, if desired. Subsequently the polyurethane-impregnated geotextile is conformed to the shape of the surface of the canal or ditch where the polyurethane geotextile composite is allowed to fully cure. The polyurethane composition having improved water resistance used in this process is less likely to foam under humid conditions and produces a composite with less water absorption.

As used herein, the term "geotextile" refers to any woven or non-woven porous blanket or mat which is produced from natural or synthetic fibers. Also, as used herein, the terms "ditch" and "canal" are used interchangeably and can refer to any liquid carrying surface having a depression or grade.

Geotextiles are used primarily to line earthen surfaces. Such liners may, however, also be used to line roofs, ponds, reservoirs, landfills, underground storage tanks, canals and ditches. Examples of geotextiles include woven or non-woven polypropylene, polyester, jute, cotton and fiberglass fabrics. Any of the known goetextiles may be used in the practice of the present invention.

Any of the known liquid isocyanates having an isocyanate content of at least 10% by weight, preferably at least 20% by weight, most preferably at least 30% by weight, which are liquid under the processing conditions used may be used in the practice of the present invention. Suitable liquid organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Such isocyanates include those represented by the formula $Q(NCO)_n$ in which n represents a number from 2 to about 5, preferably 2 to 3, and Q represents an aliphatic hydrocarbon group containing from 2 to about 18, preferably 6 to 10, carbon atoms, a cycloaliphatic hydrocarbon group containing from 4 to about 15, preferably from 5 to 10, carbon atoms, an araliphatic hydrocarbon group containing from 8 to 15, preferably from 8 to 13, carbon atoms, or an aromatic hydrocarbon group containing from 6 to about 15, preferably 6 to 13, carbon atoms. Examples of suitable isocyanates include: ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanato-3,3,5-trimethyl-isocyanatomethylcyclohexane ("isophorone diisocyanate" (See, e.g. German Offenlegungsschrift 1,202,785 and U.S. Pat. No. 3,401,190)); 2,4- and 2,6-hexahydrotoluene diisocyanate and mixtures of these isomers; dicyclohexylmethane-4,4'-diisocyanate ("hydrogenated MDI", or "HMDI"); 2,4- and 2,6-toluene diisocyanate and mixtures of these isomers ("TDI"); diphenylmethane-2,4'- and/or -4,4'-diisocyanate ("MDI"); polymethylene poly(phenylisocyanates) of the kind which may be obtained by condensing aniline with formaldehyde, followed by phosgenation ("crude MDI") (which are described, for example, in British Patents 878,430 and 848,671); norbornane diisocyanates (such as those described in U.S. Pat. No. 3,492,330); m- and p-isocyanatophenyl sulfonylisocyanates (of the type described in U.S. Pat. No. 3,454,606); perchlorinated aryl polyisocyanates (of the type described, for example, in U.S. Pat. No. 3,227,138); modified polyisocyanates containing carbodiimide groups (of the type described in U.S. Pat. No. 3,152,162); modified polyisocyanates containing urethane groups (of the type described, for example, in U.S. Pat. Nos. 3,394,164 and 3,644,457); modified polyisocyanates containing allophanate groups (of the type described, for example, in British Patent 994,890, Belgian Patent 761,616, and published Dutch Patent Application 7,102,524); modified polyisocyanates containing isocyanurate groups (of the type described, for example, in U.S. Pat. No. 3,002,973, German Patentschriften 1,022,789, 1,222,067 and 1,027,394, and German Offenlegungsschriften 1,919,034 and 2,004,048); modified polyisocyanates containing urea groups (of the type described in German Patentschrift 1,230,778); polyisocyanates containing biuret groups (of the type described, for example, in German Patentschrift 1,101,394, U.S. Pat. Nos. 3,124,605 and 3,201,372, and in British Patent 889,050); polyisocyanates obtained by telomerization reactions (of the type described, for example, in U.S. Pat. No. 3,654,106); polyisocyanates containing ester groups (of the type described, for example, in British Patents 965,474 and 1,072,956, in U.S. Pat. No. 3,567,763, and in German Patentschrift 1,231,688); reaction products of the above-mentioned isocyanates with acetals (as described in German Patentschrift 1,072,385); and polyisocyanates containing polymeric fatty acid groups (of the type described in U.S. Pat. No. 3,455,883). It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as 2,4- and 2,6-toluene diisocyanates and their isomer mixtures ("TDI"); diphenyl methane diisocyanate ("MDI"); polymethylene poly(phenylisocyanates) of the type obtained by condensing aniline with formaldehyde, followed by phosgenation ("crude MDI"); and polyisocyanates containing carbodiimide groups, urethane groups, allophanate groups, isocyanurate groups, urea groups, or biuret groups ("modified polyisocyanates"). The commercially available phosgenation products of aniline/formaldehyde condensates are the most preferred isocyanates to be used in the present invention.

The isocyanate-reactive component used to produce the polyurethane composition includes either (1) a combination or blend of castor oil or a modified castor oil and a polyether polyol, or (2) a modified castor oil which is a reaction product of castor oil or a modified castor oil with a polyether polyol.

In accordance with the present invention, suitable isocyanate-reactive components include: (i) from about 20 to 90% by weight, preferably 40 to 80% by weight, based on total weight of the isocyanate-reactive component, of castor oil having an OH number of from 160 to 170, a viscosity of from 500 to 900 mPa·s at 25° C., and a water content of less than 0.5% by weight, based on the total weight of castor oil, and (ii) from about 10 to 80% by weight, preferably 20 to 60% by weight, based on total weight of isocyanate-reactive component, of a polyether polyol having an OH number of from 28 to 700, preferably from 112 to 500, a functionality of from 3 to 8, preferably from 4 to 7, most preferably 2 to 3, a number average molecular weight of from about 240 to about 6,000, preferably from about 400 to about 4,000, most preferably from about 400 to about 2,000, and a viscosity of from 50 to 35,000 mPa·s, preferably from 500 to 25,000 mPa·s, at 25° C. It has been found that polyether polyols prepared from alkylene oxides in which at least 70% by weight, preferably at least 90% by weight, of the alkylene oxide content is propylene oxide are particularly suitable for the present invention. It is also advantageous to use an isocyanate-reactive component containing less than 0.5% by weight, preferably less than 0.1% by weight, based on total weight of isocyanate-reactive component of water.

Suitable polyether polyols useful in component b) include polyethers prepared, for example, by the polymerization of epoxides such as ethylene oxide, propylene oxide, butylene oxide, tetrahydrofuran, styrene oxide, or epichlorohydrin, optionally in the presence of Lewis acids such as $BF_3$, or prepared by chemical addition of such epoxides, optionally added as mixtures or in sequence, to starting components containing reactive hydrogen atoms, such as water, alcohols, or amines. Examples of starting components include: ethylene glycol, 1,3- or 1,2-propanediol, 1,2-, 1,3-, or 1,4-butanediol, trimethylolpropane, 4,4'-dihydroxydiphenylpropane, aniline, ammonia, ethanolamine, and ethylene diamine. Sucrose polyethers of the type described, for example, in German Offenlegungsschriften 1,176,358 and 1,064,938 may also be used. Polyethers which contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyether polyols include polyoxyalkylene polyether polyols, such as polyoxypropylene diol, polyoxybutylene diol, and polytetramethylene diol, as well as polyoxypropylene polyoxyethylene triols.

Other suitable polyether polyols include the so-called "PHD polyols", which are prepared by reaction of an organic polyisocyanate, hydrazine, and a polyether polyol. U.S. Pat. No. 3,325,421 discloses a method for producing suitable PHD polyols by reacting a stoichiometric or substoichiometric quantity (relative to diamine) of polyisocyanate dissolved in a polyol having a molecular weight of at least 500 and a hydroxyl number of no more than 225. See also U.S. Pat. Nos. 4,042,537 and 4,089,835.

Other polyether polyols useful in the present invention include the so-called "polymer polyols", which are prepared by polymerizing styrene and acrylonitrile in the presence of a polyether. See, for example, U.S. Pat. Nos. 3,383,351, 3,304,273, 3,523,093, 3,652,639, 3,823,201 and 4,390,645.

The most preferred polyethers are polyoxypropylene polyethers that do not contain ethylene oxide.

Any of the known low molecular weight organic diols or triols may optionally be included in the isocyanate-reactive component b) of the present invention in an amount of up to 10% by weight, based on total weight of component b). Suitable organic diols and triols have equivalent weights of from about 31 to 99. Examples of such diols and triols include: 2-methyl-1,3-propranediol; ethylene glycol; 1,2- and 1,3-propanediol; 1,3-, 1,4- and 2,3-butanediol; 1,6-hexanediol; 1,10-decanediol; diethylene glycol; triethylene glycol; tetraethylene glycol; dipropylene glycol; tripropylene glycol; glycerol; trimethylolpropane; neopentyl glycol; cyclohexanedimethanol; and 2,3,4-trimethylpentane-1,3-diol. Preferred diols and triols include dipropylene glycol and tripropylene glycol.

The reaction mixture from which the polyurethanes used in the present invention are produced also contains a catalyst c) for catalyzing the reaction between isocyanate groups and hydroxyl groups (i.e., a urethane catalyst). Such catalysts are well known in the art and are generally used in an amount which is no greater than 0.5 parts by weight per 100 parts by weight of isocyanate-reactive component, preferably from 0.0001 to 5 parts by weight, most preferably from 0.0001 to 0.1 parts by weight. Suitable catalysts include the organometallic catalysts. Preferred catalysts c) are organic tin compounds. The organic tin compounds are preferably tin (II) salts of a carboxylic acid such as tin (II) acetate, tin (II) octoate, tin (II) ethyl hexoate and tin (II) laurate and tin (IV) compounds such as dibutyl tin oxide, dibutyl tin dichloride, dibutyl tin diacetate, dibutyl tin dilaurate, dibutyl tin maleate, dioctyl tin diacetate and the like. Of course, it is also possible to use any of the urethane catalysts which are well known to those skilled in the art of polyurethane chemistry. It is preferred to use organometallic compounds.

The catalyst can be added separately to the polyurethane-forming reaction mixture or it may be combined with the isocyanate-reactive component prior to combining the polyisocyanate and polyol components.

Catalysts which catalyze the reaction of isocyanate groups with water (e.g., tertiary amines) should not be included in the polyurethane-forming reaction mixture.

Optionally, fillers can be used in the present invention. The fillers useful herein are also known. Useful fillers include calcium carbonate, barium sulfate, kieselguhr, whiting, mica, glass fibers, liquid crystal fibers, glass flakes, glass balls, aramide fibers, and carbon fibers. In addition, ground solid plastics (such as polyurethane scrap), rubber wastes (such as from tires), or any kind of ground rubber may be used.

If fillers are used, they can be added to either the polyisocyanate or the isocyanate-reactive component prior to forming the polyurethane-forming reaction mixture or they may be separately metered into the mixture.

In the practice of the invention, preferably liquid polyisocyanate component a) is mixed with isocyanate reactive component b) in the presence of a urethane catalyst c) at an NCO:OH equivalent ratio of from 1.4:1 to 0.9:1, preferably from 1.1:1.0 to 1.0 to 1.0.

The polyurethane geotextile composites having improved water resistance of the present invention can be formed as a liner for a ditch and/or canal.

In one embodiment of the present invention, the ditch and/or canal lining is made with a machine such as that described in U.S. Pat. No. 5,639,331 ("the '331 patent").

The '331 patent teaches a mobile ditch lining apparatus having reservoirs for supplying raw materials such as resin, catalysts, fillers, colors or other additives. The reservoirs are connected to a mixing chamber through flexible conduit means. The delivery rate of the raw materials to the mixing chamber will vary depending upon the particular formulation and the quantity of the formulation required for a specific area of the liner being formed. The components used to produce the polyurethane composition having improved water resistance are mixed in the mixing chamber.

From the mixing chamber, the polyurethane composition having improved water resistance is applied to one or more geotextiles. The geotextiles are pulled from a vat containing the polyurethane composition having improved water resistance through an adjustable die. The opening of the die evenly distributes of the polyurethane on the geotextile(s), determines how much polyurethane is dispensed on the geotextile(s), and also controls the thickness of the polyurethane-impregnated geotextile composite. The polyurethane-impregnated geotextile is then cut to the desired length and placed in the canal or ditch where it conforms to the surface and cures to form a polyurethane geotextile composite liner. Installing the polyurethane-impregnated geotextile liners in such a way that they overlap to a certain extent assures that a seamless permanent flexible polyurethane composite liner is obtained after curing of the polyurethane.

In another embodiment of the present invention, the polyurethane composition having improved water resistance is applied to the geotextile by spraying using commercially available two-component polyurethane spray equipment. The polyurethane-impregnated geotextile is subsequently placed in the ditch or canal where it conforms to the surface and cures to form a polyurethane geotextile composite. The geotextile can also first be cut to size, placed in the canal or ditch and subsequently sprayed with the polyurethane composition having improved water resistance. Preferably, the geotextile with the still liquid polyurethane on it is rolled with a paint roller to allow the polyurethane to penetrate through the geotextile and onto the surface of the ditch or canal.

It is also feasible to first spray the polyurethane onto one geotextile and then apply another geotextile over the first polyurethane impregnated geotextile.

In another embodiment of the invention, the polyurethane composition having improved water resistance is first sprayed on any cracked or broken concrete of a concrete lined ditch or canal and subsequently a geotextile is placed over the polyurethane-coated concrete in a manner such that the geotextile absorbs the still liquid polyurethane to form a polyurethane-impregnated composite which subsequently cures to form a solid yet flexible polyurethane geotextile composite.

State of the art sprayable polyurethane formulations are not useful in the present invention because they exhibit gel times of only several seconds. In order to prepare polyurethane geotextile composites at the site of a ditch or canal to be lined in accordance with the present invention using a polyurethane composition having improved water resistance, a gel time of at least five minutes, preferably more than 10 minutes is required.

If additional layers of polyurethane geotextile composite are desirable, any of the above processes can be repeated one or more times.

The thickness of the polyurethane geotextile composite can be varied over a wide range but usually measures from about 50 microns to about 500 microns.

The amount of polyurethane applied to the geotextile(s) can be varied but usually the amount of polyurethane applied per square meter of geotextile ranges from 1 kg to 20 kg, preferably from 2 kg to 5 kg.

If desirable several layers of the polyurethane-impregnated geotextile(s) may be applied over each other to obtain a composite of higher strength and dimensional stability. Such multi-layered composite(s) are actually preferred for lining an earthen canal or ditch.

The following examples further illustrate details for the preparation and use of the composites of this invention.

EXAMPLES

The following materials were used in the Examples which follow:

| | |
|---|---|
| Isocyanate A: | polymethylene poly (phenylisocyanate) having an NCO content of about 31.5%, a functionality of 2.6 and a viscosity at 25° C. of 200 mPa · s. |

-continued

| | |
|---|---|
| Polyol 1: | a monoethanolamine-started propylene oxide polyether polyol, having an OH number of about 350, a functionality of about 3 and a number average molecular weight of about 480. |
| Polyol 2: | a glycerine-started propylene oxide polyether polyol, having an OH number of about 250, a functionality of about 3 and a number average molecular weight of about 670. |
| Polyol 3: | a propylene glycol-started propylene oxide polyether polyol, having an OH number of 56, a functionality of about 2 and a number average molecular weight of about 2000. |
| Polyol 4: | a propylene glycol-started propylene oxide polyether polyol, having an OH number of 264, a functionality of about 2 and a molecular weight of about 425. |
| Polyol 5: | Castor Oil, DB, (CasChem, Inc.) (water content <0.5%). |
| Catalyst A: | dimethyltin dilaurate, commercially available as Fomrez UL-28 from Witco. |
| Geotextile A: | Typar-3301, spunbonded polypropylene, 3 oz/yd², 12 mils thickness (Reemay) |
| Geotextile B: | FX-40HS, polypropylene, nonwoven, heatbonded, 4 oz/yd² (Carthage Mills) |
| Geotextile C: | Trevira Spunbound Type 1620, polyester, nonwoven, heatbonded, 5.7 oz/yd², 37 mils thickness, (Fluid Systems) |

The following polyol blends were used in these Examples:

| | |
|---|---|
| Polyol Blend A: | 10 pbw Polyol 1 |
| | 45 pbw Polyol 2 |
| | 45 pbw Polyol 3 |
| | 0.01 pbw Catalyst A |
| Polyol Blend B: | 80 pbw Polyol 5 |
| | 20 pbw Polyol 4 |
| | 0.01 pbw Catalyst A |

Examples 1–2

The polyurethane castings of Examples 1 and 2 were prepared according to the following procedure:

The polyol blend indicated in Table 1 and Isocyanate A were hand mixed in the amounts indicated in Table 1 at 25–30° C. for about 2 minutes, and then poured into a book-case mold which measured 8 in.×16 in.×0.125 in. at room temperature. The cast samples were allowed to cure at room temperature for 16 hours before demolding. The samples were stored for at least 1 week at room temperature in a temperature and humidity controlled environment and then tested for various physical and mechanical properties. The results of these tests are reported are in Table 1.

TABLE 1

| | Example 1* | Example 2 |
|---|---|---|
| Polyol Blend A (grams) | 100 | |
| Polyol Blend B (grams) | | 100 |
| Isocyanate A (grams) | 46.5 | 45.2 |
| Gel time (min) | 10 | 10 |
| Index (NCO/OH × 100) | 105 | 105 |
| Tensile Strength (psi) | 415 | 1336 |
| Elongation (%) | 52.3 | 58.3 |
| Split Tear (pli) | 13.5 | 99.1 |
| Die "C" Tear | 44.1 | 231.3 |
| Hardness Shore A | 73/72 | 93/86 |

TABLE 1-continued

| | Example 1* | Example 2 |
|---|---|---|
| Water Absorption 24 hours (%) | 0.93 | 0.12 |
| Water Absorption 168 hours (%) | 1.96 | 0.28 |

*comparative

The polyurethane prepared from Polyol Blend B and Isocyanate A (Example 2) in accordance with the present invention showed superior physical properties and significantly lower water absorption than the polyurethane prepared with Polyol Blend A in which no Castor Oil was present (Comparative Example 1).

Examples 3–5 (Comparative)

Polyurethane geotextile composites were prepared according to the following procedure:

100 g of Polyol Blend A, and 42.6 g of Isocyanate A were mixed and then poured onto a 1 sq. ft. piece of geotextile A. The polyurethane-forming reaction mixture was spread out with a spatula and one sq. ft. of a second Geotextile (A, B or C) was placed on top of the liquid polyurethane. A rubber roller was then rolled over the second geotextile to evenly distribute the polyurethane mixture between the geotextiles and also to roll off any excess of polyurethane. The material cured to a solid geotextile polyurethane composite in about 1 hour. The amount of resin in the composite was typically about 200 g/sq. ft. and the composite thickness ranged from 40 to 100 mils. All samples were prepared under high humidity conditions (>70%), and showed significant foaming before curing to form a solid polyurethane geotextile composite. The physical properties of each of these comparative composites were determined and the results are reported in Table 2.

TABLE 2

| | Example 3 | Example 4 | Example 5 |
|---|---|---|---|
| Polyol Blend A (grams) | 100 | 100 | 100 |
| Isocyanate A (grams) | 42.6 | 42.6 | 42.6 |
| Index | 105 | 105 | 105 |
| Catalyst A Concentration (%) | 0.01 | 0.01 | 0.01 |
| Geotextile Combination | 2 Geotextile A | 1 Geotextile A 1 Geotextile C | 1 Geotextile A 1 Geotextile B |
| Tensile Strength (psi) | 1582.7 | 1056 | 1367.3 |
| Elongation (%) | 51 | 56.3 | 44.7 |
| Split Tear (pli) | 115.9 | 151.6 | 123.3 |
| Die "C" Tear | 376.1 | 155.4 | 192.8 |
| Water Absorption 24 hours (%) | 3.52 | 3.93 | 1.96 |
| Water Absorption 168 hours (%) | 5.54 | 4.82 | 3.31 |

Examples 6–8

Polyurethane geotextile composites were prepared according to the following procedure:

100 g of Polyol Blend B and 46 g of Isocyanate A were mixed and then poured onto a 1 sq. ft. piece of geotextile A. The polyurethane-forming reaction mixture was spread out with a spatula and one sq. ft. of the second Geotextile (A, B or C) was placed on top of the liquid polyurethane. A rubber roller was then rolled over the second geotextile to evenly distribute the polyurethane mixture between the geotextiles and also to roll off any excess of polyurethane. The material cured to a solid geotextile polyurethane composite in about 1 hour. The amount of resin in the composite was typically about 200 g/sq. ft. and the composite thickness ranged from 40 to 100 mils. All samples were prepared under high humidity conditions (>70%), and showed no indications of foaming. The physical properties of each of these composites prepared in accordance with the present invention were determined and the results are reported in Table 3.

TABLE 3

|  | Example 6 | Example 7 | Example 8 |
|---|---|---|---|
| Polyol Blend B (grams) | 100 | 100 | 100 |
| Isocyanate A (grams) | 46 | 46 | 46 |
| Index | 105 | 105 | 105 |
| Catalyst A Concentration (%) | 0.01 | 0.01 | 0.01 |
| Geotextile Combination | 2 Geotextile A | 1 Geotextile A 1 Geotextile C | 1 Geotextile A 1 Geotextile B |
| Tensile Strength (psi) | 1451 | 1741 | 1521 |
| Elongation (%) | 55.3 | 61 | 40.7 |
| Split Tear (pli) | 165.1 | 84.3 | 100 |
| Die "C" Tear | 324.7 | 270.1 | 296.1 |
| Water Absorption 24 hours (%) | 0.025 | 0.31 | 0.35 |
| Water Absorption 168 hours (%) | 0.37 | 0.66 | 0.39 |

The composites prepared in accordance with the invention from formulations containing castor oil (Examples 6–8), showed no significant foaming when used to prepare the polyurethane geotextile composites, even under high humidity conditions. The water absorption of these polyurethane geotextile composites was also significantly lower than that measured for the composites made and tested in comparative Examples 3–5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane geotextile composite liner comprising a geotextile impregnated with a water resistant polyurethane which is a reaction product of a mixture comprising:
    a) a liquid polyisocyanate having an isocyanate content of at least 10% by weight,
    b) an isocyanate-reactive component comprising:
        (i) 20 to 90% by weight, based on total by weight of b), of castor oil having an OH number of from about 160 to about 170, a viscosity of about 500 to about 900 mPa·s at 25° C., and a water content of less than 0.5% by weight, based on the weight of castor oil;
        (ii) 10 to 80% by weight, based on total weight of b), of a polyether polyol having an OH number of from 28 to 700, a functionality of from 2 to 8, a number average molecular weight of from about 240 to about 6,000, and a viscosity of from 50 to 35,000 mPa·s at 25° C., The polyether polyol being the reaction product of an initiator compound with an alkylene oxide of which at least 70% by weight is propylene oxide; and
        (iii) from 0 to 10% by weight, based on total weight of b), of a low molecular weight diol or triol having an equivalent weight of from 31 to 99;
    c) a catalyst which catalyzes the reaction between hydroxyl groups and isocyanate groups; and optionally,
    d) a filler,
   wherein said polyurethane geotextile composite liner has improved water resistance, and wherein said improved water resistance comprises a water absorption at 24 hours with a maximum value of about 0.4% or less and said liner is suitable as a ditch or canal liner.

2. The composite of claim 1, wherein the isocyanate reactive component b) contains no more than 0.1% by weight water prior to reaction with the liquid polyisocyanate a).

3. The composite of claim 1, wherein the amounts of components a) and b) are such that a ratio of equivalents of isocyanate groups to equivalents of hydroxyl groups of from 1.4:1.0 to 0.9:1.0 is achieved.

4. The composite of claim 1, wherein the amounts of components a) and b) are such that a ratio of equivalents of isocyanate groups to equivalents of hydroxyl groups of from 1.1:1.0 to 1.0 to 1.0 is achieved.

5. The composite of claim 1 wherein the liquid polyisocyanate has an isocyanate group content of more than 20% by weight.

6. The composite of claim 1, wherein the liquid polyisocyanate has an isocyanate group content of more than 30% by weight.

7. The composite of claim 1, wherein catalyst c) is an organometallic catalyst.

8. The composite of claim 1, wherein the polyether polyol is a polyoxypropylene polyether having a number average molecular weight of from 400 to 4,000 and an average functionality of 2 to 3.

9. A process for producing a polyurethane geotextile composite liner comprising:
    (1) impregnating a geotextile with a water-resistant polyurethane which is a reaction product of a mixture comprising:
        a) a liquid polyisocyanate having an isocyanate content of at least 10% by weight,
        b) an isocyanate-reactive component comprising:
            (i) 20 to 90% by weight, based on total weight of b), of castor oil having an OH number of about 160 to about 170, a viscosity of about 500 to about 900 mPa·s at 25° C., and a water content of less than 0.5% by weight, based on total weight of castor oil;
            (ii) 10 to 80% by weight, based on total weight of b), of a polyether polyol having an OH number of from 28 to 700, a functionality of from 2 to 8, a number average molecular weight of from about 240 to about 6,000, and a viscosity of from 50 to 35,000 mPa·s at 25° C., the polyether polyol being the reaction product of an initiator compound with an alkylene oxide in which at least 70% by weight the alkylene oxide is propylene oxide; and
            (iii) from 0 to 10% by weight, based on total weight of b) of a low molecular weight diol or triol having an equivalent weight of from 31 to 99;
        c) a urethane catalyst, and optionally,
        d) a filler;
    (2) conforming the polyurethane-impregnated geotextile to a surface to be lined before the polyurethane has fully cured; and
    (3) allowing the polyurethane to fully cure,
   wherein said polyurethane geotextile composite liner has improved water resistance, and wherein said improved water resistance comprises a water absorption at 24 hours with a maximum value of about 0.4% or less.

10. The process of claim 9, wherein the isocyanate reactive component b) contains no more than 0.1% by weight water prior to reaction with the liquid polyisocyanate a).

11. The process of claim 9, wherein the amounts of components a) and b) are such that ratio of equivalents of isocyanate groups to equivalents of hydroxyl groups of from 1.4:1 to 0.9:1 is achieved.

12. The process of claim 9, wherein the amounts of components a) and b) are such that a ratio of equivalents of isocyanate groups to equivalents of hydroxyl groups of from 1.1:1.0 to 1.0:1.0 is achieved.

13. The process of claim 9, wherein the liquid polyisocyanate has an isocyanate group content of more than 20% by weight.

14. The process of claim 9, wherein the liquid polyisocyanate has an isocyanate group content of more than 30% by weight.

15. The process of claim 9, wherein catalyst c) is an organometallic compound.

16. The process of claim 9, wherein the polyether polyol is a polyoxypropylene polyether having a number average molecular weight of from 400 to 4,000 and an average functionality of 2 to 3.

17. The process of claim 9 in which the geotextile is impregnated with the polyurethane by dispensing the polyurethane composition onto the geotextile.

18. A ditch or canal lined by the process of claim 17.

19. The process of claim 9 in which the geotextile is impregnated with the polyurethane by dispensing the polyurethane onto a surface to be lined, placing the geotextile on top of the dispensed polyurethane and applying sufficient pressure to the geotextile to cause the polyurethane to impregnate the geotextile.

20. A ditch or canal lined by the process of claim 19.

21. A ditch or canal lined by the process of claim 9.

* * * * *